(12) United States Patent
Jeansonne et al.

(10) Patent No.: US 10,867,045 B2
(45) Date of Patent: Dec. 15, 2020

(54) RUNTIME VERIFICATION USING EXTERNAL DEVICE

(71) Applicant: HEWLETT-PACKARD DEVELOPMENT COMPANY, L.P., Houston, TX (US)

(72) Inventors: Jeffrey Kevin Jeansonne, Houston, TX (US); Vali Ali, Houston, TX (US); David Plaquin, Bristol (GB); Maugan Villatel, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 460 days.

(21) Appl. No.: 15/752,304

(22) PCT Filed: Sep. 30, 2015

(86) PCT No.: PCT/US2015/053345
§ 371 (c)(1),
(2) Date: Feb. 13, 2018

(87) PCT Pub. No.: WO2017/058225
PCT Pub. Date: Apr. 6, 2017

(65) Prior Publication Data
US 2018/0239901 A1    Aug. 23, 2018

(51) Int. Cl.
*G06F 9/44* (2018.01)
*G06F 21/52* (2013.01)
(Continued)

(52) U.S. Cl.
CPC ............ *G06F 21/572* (2013.01); *G06F 8/66* (2013.01); *G06F 9/44* (2013.01); *G06F 9/4401* (2013.01);
(Continued)

(58) Field of Classification Search
None
See application file for complete search history.

(56) References Cited

U.S. PATENT DOCUMENTS 6,401,208 B2    6/2002  Davis et al.
6,625,730 B1    9/2003  Angelo
(Continued)

FOREIGN PATENT DOCUMENTS

CN    102332070 A    1/2012
TW       I436280 B    5/2014
(Continued)

OTHER PUBLICATIONS

Zhang, F. et al, "IOCheck: A Framework to Enhance the Security of I/O Devices at Runtime", Apr. 30, 2013.
(Continued)

*Primary Examiner* — Tanh Q Nguyen
(74) *Attorney, Agent, or Firm* — HPI Patent Department

(57) ABSTRACT

Examples herein disclose a processor-based computing system. The system comprises at least one processor, a non-volatile memory comprising a basic input output system (BIOS), wherein the BIOS creates a data structure and sets up at least one verification software component executed by the processor, a controller communicatively linked to the at least one verification software component, and a memory comprising a system management memory coupled to the at least one processor and code which is executable by the processor-based system to cause the processor to validate the BIOS during a runtime of the processor-based system using the at least one verification software component and the controller.

15 Claims, 3 Drawing Sheets

(51) Int. Cl.
  *G06F 21/56* (2013.01)
  *G06F 21/57* (2013.01)
  *G06F 21/64* (2013.01)
  *G06F 8/65* (2018.01)
  *G06F 9/4401* (2018.01)
  *G06F 11/22* (2006.01)
  *G06F 11/36* (2006.01)

(52) U.S. Cl.
  CPC .............. *G06F 11/22* (2013.01); *G06F 21/52* (2013.01); *G06F 21/56* (2013.01); *G06F 21/562* (2013.01); *G06F 21/57* (2013.01); *G06F 21/575* (2013.01); *G06F 21/64* (2013.01); *G06F 8/65* (2013.01); *G06F 11/3668* (2013.01)

(56) References Cited

U.S. PATENT DOCUMENTS

| | | |
|---|---|---|
| 6,715,106 B1 | 3/2004 | Mermelstein |
| 7,200,758 B2 | 4/2007 | Zimmer |
| 7,558,966 B2 | 7/2009 | Durham et al. |
| 8,832,454 B2 | 9/2014 | Khosravi et al. |
| 2002/0004905 A1* | 1/2002 | Davis .................... G06F 21/575 713/193 |
| 2004/0193865 A1* | 9/2004 | Nguyen ................ G06F 9/4401 713/2 |
| 2010/0048296 A1 | 2/2010 | Adiraju |
| 2014/0095886 A1* | 4/2014 | Futral .................... G06F 21/72 713/187 |
| 2015/0006714 A1 | 1/2015 | Jain |
| 2015/0324588 A1* | 11/2015 | Locke .................. G06F 21/562 713/2 |
| 2016/0055332 A1* | 2/2016 | Jeansonne ............. G06F 9/4406 726/22 |
| 2016/0063255 A1* | 3/2016 | Jeansonne ............. G06F 21/572 713/2 |
| 2017/0262352 A1* | 9/2017 | Jeansonne ............. G06F 21/566 |
| 2018/0239901 A1* | 8/2018 | Jeansonne ............. G06F 21/575 |

FOREIGN PATENT DOCUMENTS

| | | |
|---|---|---|
| TW | I478062 B | 3/2015 |
| TW | 201519623 A | 5/2015 |

OTHER PUBLICATIONS

An Analysis of System Management Mode (SMM)—based Integrity Checking Systems and Evasion Attacks.

BIOS Integrity Measurement Guidelines (Draft)—Recommendations of the National Institute of Standards and Technology.

HyperSentry: Enabling Stealthy In-Context Measurement of Hypervisor Integrity.

* cited by examiner

RUNTIME VERIFICATION USING EXTERNAL DEVICE

BACKGROUND

The computing system can include code to perform various startup functions of the computing device. This code includes Basic Input/Output System (BIOS) code. The BIOS code initializes and tests hardware of the computing device. Basic Input/Output System (BIOS) performs a number of tasks when a computer is started, from initializing the microprocessor to initializing and testing hardware to starting the operating system. Additionally, the BIOS code may load bootstrap code and/or an operating system from a memory device of the computing device. Further, the BIOS contains all the code required to control the keyboard, display screen, disk drives, serial communications, and a number of miscellaneous functions.

BRIEF DESCRIPTION OF THE DRAWINGS

In the accompanying drawings, like numerals refer to like components or blocks. The following detailed description references the drawings, wherein.

DETAILED DESCRIPTION

Installation of BIOS code into a computing device may occur at a manufacturing level or post-manufacturing level. The BIOS may be associated with a digital signature and a key pair for validation upon initialization. The BIOS may be developed in a controlled manner in communication with the computing device. This further provides updates to the BIOS in a seamless manner as the computing device may receive updates from a remote location (e.g., external source). Every time the computing device is switched on, the BIOS immediately takes command (control). Initially, the BIOS runs through a series of diagnostic routines, system checks to ensure that every part of the computing device is functioning correctly before any time or data is trusted to the computing device. The BIOS checks the circuits of the system board and the memory, the keyboard, the disks and each expansion board. After the computing device is operational, the BIOS firmware runs several sets of routines that programs call to carry out everyday functions—typing characters on the screen, reading keystrokes, and timing events.

In this example, the computing device achieves runtime verification of the integrity of the BIOS using a secure verification software and an external component (e.g., an embedded controller). The external hardware component does not require real-time access to the memory but only needs to have a secure communication link with the secure verification software. In one example, the command and the BIOS may be transmitted and are each digitally signed with different private keys. This provides an additional security feature as both the command and the BIOS may be validated prior to installation of the BIOS. Although in the implementations referred below, a BIOS is incorporated and described in great detail. In other implementation, a Unified Extensible Firmware Interface (UEFI) may be used instead. UEFI is designed as a successor to the BIOS and may replace the BIOS in accordance with the principles disclosed herein.

Figure 1:
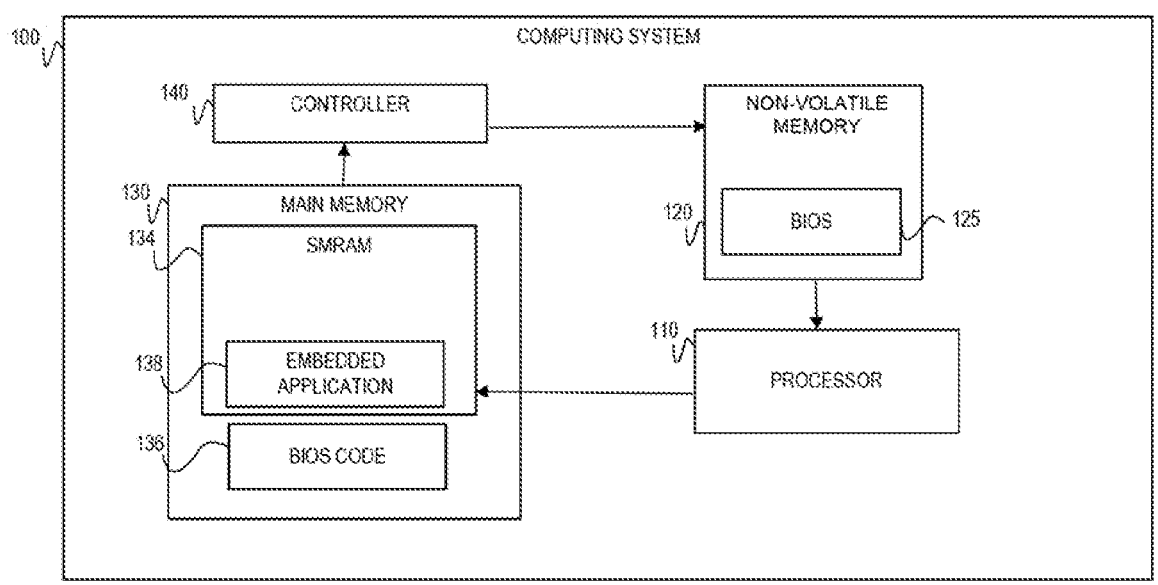
FIG. 1 is a block diagram of an example computing system for verifying the integrity of BIOS in the computing system in accordance with the principles disclosed herein.

With reference to FIG. 1, in accordance with some examples of the invention, a processor-based system such as a computing system 100 may include at least one processor 110, at least one memory 120 coupled to the at least one processor 110, and a code block 125 (e.g. stored in the memory 120). The memory 120 may be a non-volatile memory (e.g., read-only memory). The computing system 100 further includes a controller 140 and a main memory 130, which, in one implementation, may be a volatile memory (e.g., random-access memory). The main memory 130 comprises BIOS code 136. The system 100 generates integrity information associated from the code block 125 (e.g., BIOS) to verify the BIOS code 136 at runtime. As such, implementations of the computing system 100 include a mobile device, client device, personal computer, desktop computer, laptop, tablet, portable device, video game console, or other type of electronic device. The system 100 may further include code which is executable by the computing system 100 to cause the computing system 100 to generate integrity information for the BIOS code 136 upon a restart of the computing system 100 and validate an integrity of the BIOS code 136 during a runtime of the computing system 100 using the integrity information. The code block 125 may correspond to one of a firmware element such as the BIOS.

The computing system 100 includes a controller 140 to achieve runtime verification of the integrity of the BIOS. Implementations of the controller 140 include a processor, electronic device, computing system, microprocessor, microchip, chipset, electronic circuit, semiconductor, microcontroller, central processing unit (CPU), or other type of processing system. In one implementation, the controller 140 may be an external hardware component to the system 100. In other implementation, the controller 140 may be incorporated into the computing system 100. The controller 140 may not need to be connected to the memory 130 real-time as long as the controller 140 maintains a secure communication link with secure verification software (e.g., embedded application 138) that runs on the processor 110. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

In one example, the controller 140 is an external hardware component embedded into the computing device. The computing system 100 may receive a data package transmitted by the controller 140. The data package may include a command and a BIOS file. As part of the data package, both the command and the BIOS file include digital signatures. For example, the command may be digitally signed with a private key. The controller 140 verifies the signature of the BIOS 125 using a public key embedded in the controller 140. The BIOS 125 (which also contains the embedded application 138) is loaded in the main memory 130 by the processor 110, and the processor 110 executes the BIOS 125. In one implementation, when executing, the BIOS code 136 sets up a secure channel with the controller 140 by sending a symetric key for the controller 140 to use. In this example, a command is sent to the controller 140. In another implementation, the BIOS code 136 sets up a secure channel with the controller 140 by using a pair of asymetric keys created at boot time. In this example, the BIO and the controller 140 exchange their associated keys during boot time. The key is given to the secure verification software, and only the secure verification software can access it. Though the keys are described as asymmetric keys and signatures, in other implementations, the key may be an asymmetric key.

The command is a request sent to the computing system 100 to direct the computing system 100 to verify the integrity of the BIOS. In this implementation, the computing system 100 receives a cryptographic key corresponding to the digital signature prior to receipt of the command. In one implementation, for authentication and/or verification of the command, the computing system 100 uses this cryptographic key to verify the digital signature associated with the command. This is only required when being sent from the computing system 100 to the controller 140. The computing system 100 illustrates a computing system which may communicate over a network such as a wide area network (WAN), local area network (LAN), personal area network (PAN), mesh network, mobile device network, or other type of network capable of transmitting the command to the computing system 100. In another implementation, an external source may communicate directly with the computing system 100 by coming within close proximity computing system 100.

The non-volatile memory 120 is a storage area within the computing system 100 which maintains BIOS 125. As such, implementations of the non-volatile memory 120 include read-only memory, flash memory, ferroelectric memory, ferroelectric RAM, magnetic storage memory, storage drive, memory component, or any combination of such memory components to maintain the BIOS 125. As discussed above, the BIOS 125 device is responsible for booting a computer by providing a basic set of instructions and performing system start-up tasks. The BIOS 125 provides an interface to the underlying hardware for the operating system in the form of a library of interrupt handlers. The BIOS 125 includes BIOS that exists on the computing system 100 prior to installation of a test BIOS. In one implementation, the BIOS 125 is previously installed on the computing system 100 prior to the installation of the test BIOS. As explained earlier, the test BIOS may be included as part of the BIOS file within the data package to the computing system 100. In one implementation, the test BIOS may be a modification to the corresponding portion of the BIOS 125. The modification may include an update, development, and/or debugging aspect to the BIOS 125.

Moreover, the computing system 100 comprises a main memory 130 (e.g., random access memory). The main memory 130 can be directly accessed by the CPU. The main memory 130 is where programs and data are stored when the processor 110 is actively using them. When programs and data become active, they are copied into the main memory 130 where the processor 110 can interact with them. The main memory 130 comprises a system management random access memory (SMRAM) 134 and BIOS code 136. The SMRAM 134 is a portion of the systems memory used by the processor to store code used with system management mode. The SMRAM 134 is accessible by the processor 110 and nor the operating system or other programs. The SMRAM 134 also stores processor status and system management interrupt (SMI) handlers. SMI handlers are software routines which perform various system management functions including system power control. The SMRAM is reserved for proprietary processing including processing of the BIOS code 136 used to update the BIOS 125. In one implementation, the BIOS code 136 contains an SMI Dispatcher component responsible for handling SMI and calling the appropriate service to service a request. In one implementation, the SMI Dispatcher sends an SMI Enter Event message to the controller 140 prior to calling any other services.

In one implementation, during the booting process of the computing system 100, the processor 110 executes the BIOS 125 from the non-volatile memory 120. The BIOS 125 initializes the system management RAM (SMRAM) and copies itself into the main memory 130. Further, the BIOS 125 builds a data structure (i.e., manifest) for static code modules with a hash for each module. More specifically, the BIOS 125 creates automatically a data structure (called manifest) that contains memory address ranges and cryptographic hash (e.g., SHA1, SHA256 and/or alike) of the memory content of each of those memory areas. The memory areas include the SMI Dispatcher code, the rest of the static code of the BIOS and data structures such as the SMI Dispatch Table.

In one implementation, at boot time, the BIOS 125 creates secure verification software components (i.e., SMI Exit Checker and/or SMM Memory Checker). In one implementation, the software may be created using Intel BIOS Guard, Intel SGX or alike. The BIOS 125 also generates a random number and passes the number to the verification software components and to the controller 140. In one example, the random number may be private and inaccessible to any other software in the computing system 100. In such example, access to the number may be granted if the integrity of the components match to confirm that only the right components access the number.

In one implementation, upon the completion of the booting process of the BIOS 125, the BIOS 125 sends a message (e.g., End Of Boot) to the controller 140 and initiates the following processes. First, the controller 140 generates an SMI Scan Event message. The processor 110 handles the SMI and starts execution of the SMI Dispatcher. The controller 140 expects a SMI Enter Event message within a specific timeframe in response to the SMI Scan Event message that the controller 140 generated. In the event that the controller does not receive the message within the specified timeframe, the runtime verification of the integrity of the BIOS 125 fails. In the event that the SMI Dispatcher sends an SMI Enter Event message to the controller 140, the controller 140 expects an SMM Scan Result message within a specific timeframe. In the event the controller does not receive the message within the specified timeframe, the runtime verification of the integrity of the BIOS 125 fails. In the event that the SMI Dispatcher identifies an SMI Scan Event, the controller 140 executes the SMM Memory Checker software. The SMM Memory Checker uses the manifest to verify the integrity of all the memory areas described in the manifest. More specifically, the SMM Memory Checker computes the same cryptographic hash used to create the manifest and compares the results with the one present in the manifest. In another implementation, the SMM Memory Checker verifies a non-empty randomly selected subset of the entries in the manifest for performance reasons. Further, the SMM Memory Checker then uses the randomly generated number to send an authenticated SMM Scan Result Event message to the controller 140. In one implementation, the SMM Scan Result Event message includes the status of the verification of the integrity of the BIOS 136. In the event of detecting no errors, the status of the verification may be positive. In the event of detecting an error, an error message may be delivered. Further, the controller 140 may expect an SMI Exit Event message within a specific timeframe. In the event that the message is not received within the specified timeframe, the runtime verification of the integrity of the BIOS 125 fails.

Finally, the SMI Dispatcher code ensures that the secure software SMI Exit Checker is executed. More specifically, the SMI Exit Checker verifies the integrity of the SMI Dispatcher and verifies that it is the last code being executed prior to returning from SMI. Upon verifications, the SMI Exit Checker uses the randomly generated number to send an authenticated SMI Exit Event message to the controller 140 and exits.

In one implementation, in parallel to the process explained in detail above, a second process may be implemented. First, a system software running on the processor or a component of the computing system 100 other than the controller 140 generates an SMI to be processed by the BIOS. The SMI Dispatcher sends an SMI Enter Event message to the controller 140. The controller 140 expects an SMI Exit Event message for a specific amount of time. In the event that the controller 140 does not receive the message within the specific amount of time, or receives a different message, the runtime verification of the integrity of the BIOS 125 fails.

The SMI Dispatcher identifies the SMI event and executes the required code to handle the event. Finally, the SMI Dispatcher code ensures that the secure software SMI Exit Checker is executed. More specifically, the SMI Exit Checker verifies the integrity of the SMI Dispatcher and verifies that it is the last code being executed prior to returning from SMI. Upon verifications, the SMI Exit Checker uses the randomly generated number to send an authenticated SMI Exit Event message to the controller 140 and exits.

Figure 2:
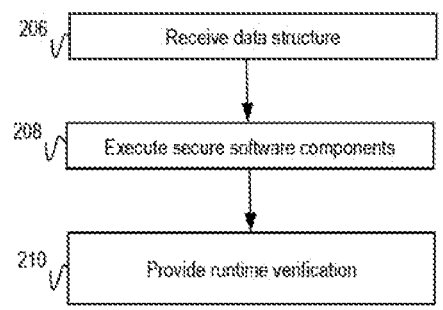
FIG. 2 is a flowchart of an example method executable by a computing device to verify integrity of BIOS in a computing system in accordance with the principles disclosed herein.

Turning now to the operation of the system 100 described in FIG. 1, FIG. 2 is a block diagram of an example method executable by a computing device to achieve runtime verification of the integrity of the BIOS using a combination of a secure verification software (i.e., software running on a processor of the computing system, where access to the software is restricted) and an external hardware component (e.g., embedded controller) during the booting process. FIG. 2 specifically focuses on the booting process for the computer system 100, as described in reference to FIG. 1. In another example, the processor 110 as in FIG. 1 executes operations 206-210. Further, although FIG. 2 is described as implemented by the computing device, it may be executed on other suitable components.

In one implementation, the process may start with the BIOS 125 initializing the system management RAM (SMRAM) and copying itself into the main memory 130. In one implementation, the processor 110 executes the BIOS 125 from the non-volatile memory 120. At operation 206, the system receives a data structure. More specifically, the BIOS 125 builds a data structure (i.e., a manifest) for static code modules with a hash (e.g., SHA1, SHA256 and/or alike) for each module. More specifically, the BIOS 125 creates automatically the data structure (called manifest) that contains memory address ranges and cryptographic hash of the memory content in memory areas. The memory areas include the SMI Dispatcher code, the rest of the static code of the BIOS and data structures such as the SMI Dispatch Table. At operation 208, the system executes secure software components. More specifically, the BIOS 125 creates the secure software components (i.e., SMI Exit Checker and SMM Memory Checker). In one example, the software may be created using Intel BIOS Guard, Intel SGX or alike.

At operation 210, the system may provide a runtime verification of the BIOS using the secure software components and the controller. In one implementation, the runtime verification may be delivered using a randomly generated number (i.e., a secret). The number is between the controller and the verification software components (e.g., code sending messages such as SMI Entry Event message, SMI Scan Result message and SMI Exit Event message), which will be discussed in greater detail in reference to FIG. 3. More specifically, the BIOS 125 generates a random number and passes the number to the verification software components and to the controller 140. In one example, the random number may be private and inaccessible to any other software in the computing system 100. In such example, access to the number may be granted only to the verification software components that match the number at the creation of the components.

Although the flowchart of FIG. 2 shows a specific order of performance of certain functionalities, method 200 is not limited to that order. For example, the functionalities shown in succession in the flowchart may be performed in a different order, may be executed concurrently or with partial concurrence, or a combination thereof. In some examples, features and functionalities described herein in relation to FIG. 2 may be provided in combination with features and functionalities described herein.

Figure 3:
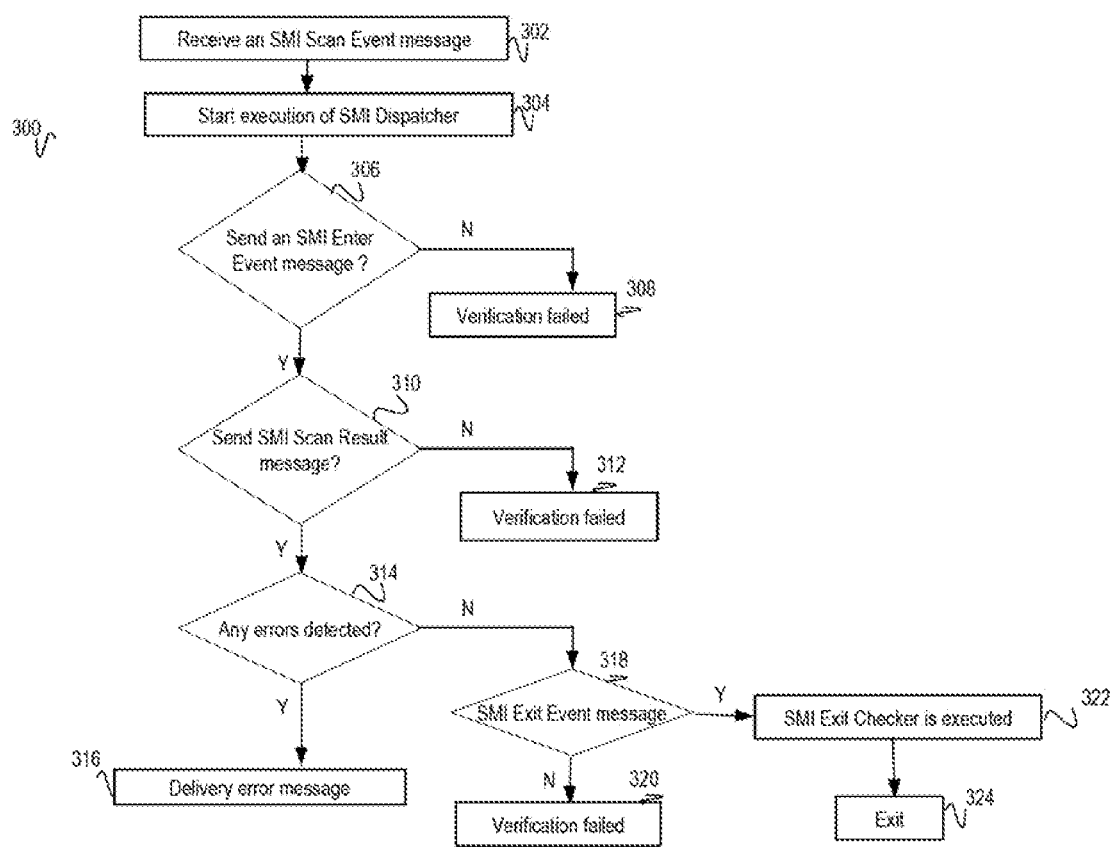
FIG. 3 is a flowchart of an example method executable by a computing device to verify integrity of BIOS in a computing system in accordance with the principles disclosed herein.

Turning now to the operation of the system 100 described in FIG. 1, FIG. 3 is a block diagram of an example method executable by a computing device to achieve runtime verification of the integrity of the BIOS using a combination of a secure verification software (i.e., software running on a processor of the computing system, where access to the software is restricted) and an external hardware component (e.g., embedded controller) after the booting process. FIG. 3 specifically focuses on a computer system after the completion of the booting process of the BIOS 125 as described above in more detail in reference to FIG. 1. In another example, the processor 110 as in FIG. 1 executes operations 302-324. Further, although FIG. 3 is described as implemented by the computing device, it may be executed on other suitable components.

The BIOS 125 sends a message (e.g., End Of Boot) to the controller 140 and initiates the following processes. First, the controller generates an SMI Scan Event message at operation 302, which is received by the processor. The processor bandies the SMI and starts execution of the SMI Dispatcher at operation 304. At operation 306, the controller expects to receive an SMI Enter Event message within a specific timeframe in response to the SMI Scan Event message that the controller generated. In the event that the controller does not receive the message within the specified timeframe at operation 308, the runtime verification of the integrity of the BIOS fails. In the event that the processor (e.g., running the SMI Dispatcher) sends an SMI Enter Event message to the controller, the controller expects an SMI Scan Result message within a specific timeframe at operation 310. In the event the controller does not receive the message within the specified timeframe, the runtime verification of the integrity of the BIOS fails at operation 312. In the event that the SMI Dispatcher identifies an SMI Scan Event, the processor (executing a verification software component such as SMM Memory Checker) sends an authenticated SMI Scan Result Event message to the controller. In one implementation, the SMI Scan Result Event message includes the status of the verification of the integrity of the BIOS at operation 314. In the event of detecting no errors, the status of the verification may be positive. In the event of detecting an error, an error message may be delivered at operation 316. Further, when the status is positive (e.g., no errors are found), the controller may expect an SMI Exit Event message within a specific timeframe at operation 318. In the event that the message is not received within the specified timeframe, the runtime verification of the integrity of the BIOS fails at operation 320.

Finally, the SMI Dispatcher code ensures that the secure software SMI Exit Checker is executed. In the event that the SMI Exit Event message is sent to the controller, the SMI Exit Checker is executed at operation 322. More specifically, the SMI Exit Checker verifies the integrity of the SMI Dispatcher and verifies that it is the last code being executed prior to returning from SMI. Upon verifications, the SMI Exit Checker uses the randomly generated number to send an authenticated SMI Exit Event message to the controller and exits at operation 324.

It should be noted that the SMM Memory Checker uses the manifest to verify the integrity of all the memory areas described in the manifest at operation. More specifically, the SMM Memory Checker computes the same cryptographic hash used to create the manifest and compares the results with the one present in the manifest. In another implementation, the SMM Memory Checker verifies a non-empty randomly selected subset of the entries in the manifest for performance reasons.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, features and functionalities described herein in relation to FIG. 3 may be provided in combination with features and functionalities described herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

We claim:

1. A processor-based computing system, comprising:
   at least one processor;
   a non-volatile memory comprising a basic input output system (BIOS), wherein the BIOS includes instructions that are executed by the at least one processor to create a data structure and set up at least one verification software component for execution by the at least one processor;
   a microprocessor communicatively linked to the at least one verification software component; and
   a memory comprising a system management memory coupled to the at least one processor and code which is executable by the processor-based computing system to cause the at least one processor to validate the BIOS during a runtime of the processor-based computing system using the at least one verification software component and the microprocessor.

2. The processor-based computing system of claim 1, wherein the microprocessor does not require access to the memory.

3. The processor-based computing system of claim 1, wherein the data structure contains memory address ranges and cryptographic hash of memory content, the cryptographic hash used to create the data structure.

4. The processor-based computing system of claim 3, wherein the at least one processor executes the at least one verification software component, and the at least one verification software component verifies integrity of memory areas in the data structure by computing the cryptographic hash used to create the data structure and comparing the computed cryptographic hash with the cryptographic hash in the data structure.

5. The processor-based computing system of claim 1, wherein the BIOS further includes instructions that are executed by the at least one processor to send a message to the microprocessor and initiate an end of a system booting process.

6. The processor-based computing system of claim 1, wherein the at least one processor handles system management interrupt (SMI) handlers comprising software routines which perform various system management functions including a system booting process.

7. The processor-based computing system of claim 1, wherein the microprocessor sends a system management interrupt (SMI) Scan Event message and expects a SMI Enter Event message within a specified timeframe in response to the SMI Scan Event message.

8. The processor-based computing system of claim 7, wherein the BIOS is invalidated if the SMI Enter Event message is not provided to the microprocessor within the specified timeframe.

9. The processor-based computing system of claim 7, wherein the microprocessor expects a system management memory (SMM) Scan Result message within the specified timeframe if the SMI Enter Event message is provided to the microprocessor.

10. The processor-based computing system of claim 9, wherein the BIOS is invalidated if the SMM Scan Result message is not provided to the microprocessor within the specified timeframe.

11. The processor-based computing system of claim 1, wherein the BIOS further includes instructions that are executed by the at least one processor to generate a random number and send it to the at least one verification software component and to the microprocessor.

12. The processor-based computing system of claim 11, wherein the at least one verification software component sends a message to the microprocessor using the randomly generated number, the message comprising status of runtime verification of the BIOS.

13. The processor-based computing system of claim 12, wherein the status comprises a success message or an error message.

14. A method, performed by a computing device, comprising:
   receiving a data structure comprising memory address ranges and cryptographic hash of memory content in memory areas, the memory areas comprising code associated with a basic input output system (BIOS) and communicated to a microprocessor;
   executing at least one verification software component to verify integrity of the memory areas in the data structure; and
   providing runtime verification of the BIOS using the least one verification software component and the microprocessor,
   wherein the least one verification software component and the data structure are created by instructions of the BIOS executed by the computing device.

15. The method of claim 14, wherein executing at least one verification software component to verify integrity of the memory areas in the data structure comprises computing a cryptographic hash used to create the data structure and comparing the computed cryptographic hash with the cryptographic hash in the data structure.

\* \* \* \* \*